(12) United States Patent
Abe et al.

(10) Patent No.: US 7,958,863 B2
(45) Date of Patent: Jun. 14, 2011

(54) INTAKE DEVICE FOR INTERNAL COMBUSTION ENGINE

(75) Inventors: Kazuyoshi Abe, Susono (JP); Chiemi Sasaki, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 322 days.

(21) Appl. No.: 12/227,295

(22) PCT Filed: Apr. 20, 2007

(86) PCT No.: PCT/JP2007/059136
§ 371 (c)(1),
(2), (4) Date: Nov. 13, 2008

(87) PCT Pub. No.: WO2007/135840
PCT Pub. Date: Nov. 29, 2007

(65) Prior Publication Data
US 2009/0229557 A1    Sep. 17, 2009

(30) Foreign Application Priority Data

May 24, 2006  (JP) .................. 2006-144445
Nov. 9, 2006  (JP) .................. 2006-304536

(51) Int. Cl.
*F02B 31/00* (2006.01)
(52) U.S. Cl. ...................................... 123/306
(58) Field of Classification Search .............. 123/306
See application file for complete search history.

(56) References Cited

U.S. PATENT DOCUMENTS

| 5,596,957 | A | 1/1997 | Ichinose et al. |
| 6,295,815 | B1 | 10/2001 | Bechle et al. |
| 2002/0005185 | A1 | 1/2002 | Schatz |

FOREIGN PATENT DOCUMENTS

| JP | U-63-128239 | 8/1988 |
| JP | U-2-126035 | 10/1990 |
| JP | A-7-174028 | 7/1995 |
| JP | A-9-280066 | 10/1997 |
| JP | A-2002-309946 | 10/2002 |
| JP | A-2003-106158 | 4/2003 |
| JP | A-2005-140050 | 6/2005 |
| JP | A-2005-171813 | 6/2005 |

OTHER PUBLICATIONS

Feb. 26, 2010 Search Report issued in European Patent Application No. 07742571.8.

*Primary Examiner* — Noah Kamen
(74) *Attorney, Agent, or Firm* — Oliff & Berridge, PLC

(57) ABSTRACT

In an intake device for an internal combustion engine, in which a valve body rotatable about a valve shaft is provided within an intake passage and by which an intake flow is controlled, the valve shaft is eccentric with a center of the valve body and is supported at a position eccentric with a center of the intake passage. When the valve body rotates, a half open state is formed from a fully closed state via a fully open state. The butterfly-type intake control valve are simply altered, so that the fully closed state, the fully open state, and the half open state can be formed and the vortex flow can be formed into the cylinder.

2 Claims, 12 Drawing Sheets

FULLY CLOSED STATE

FULLY OPEN STATE

HALF OPEN STATE

CONSTANT FLOW PASSAGE AREAS SQ

FULLY CLOSED STATE

FULLY OPEN STATE

HALF OPEN STATE

FULLY CLOSED STATE

FULLY OPEN STATE

HALF OPEN STATE

INTAKE DEVICE FOR INTERNAL COMBUSTION ENGINE

TECHNICAL FIELD

The present invention relates to an intake device that controls an intake flow passing through an intake pipe of an internal combustion engine.

BACKGROUND ART

Conventionally, there are various proposals of an intake device that controls an intake flow by disposing an intake control valve in an intake pipe through which the intake flow is supplied to the cylinder side of the internal combustion engines, the intake control valve forming a tumble flow (longitudinal vortex flow) or a swirl flow (lateral vortex flow). The tumble flow or the swirl flow is suitably formed in the cylinder, thereby improving combustion efficiency and an output power of the internal combustion engine. As an intake control valve employed in the intake device, there is known the intake control valve in which a valve body having a plate shape rotates about a valve shaft. The valve shaft is supported at a predetermined position of the intake passage so as to rotate the valve body, thereby changing the degree of opening and forming desirable tumble flow or swirl flow.

For example, Patent Document 1 proposes an intake device employing a cantilever-type intake control valve. Additionally, the cantilever-type intake control valve is a valve in which a valve body is provided with a valve shaft at its end and is rotated about the valve shaft. In the intake device of Patent Document 1, the valve shaft is disposed in the proximity of an inner wall of the intake passage, so the cantilever-type intake control valve is rotated. Then, this intake device has valve drive means. The valve drive means brings the intake control valve to be fully closed at the range of low speed and low load. The valve drive means brings the intake control valve to be half opened at the range of low speed and middle load, at the range of middle speed and middle load, and at the range of middle speed and low load. The valve drive means brings the intake control valve to be fully opened at the range of the high speed and the high load. Therefore, the intake device of the Patent document 1 controls the intake flow in stages by appropriately rotating the valve body about the valve shaft.

Patent Document 1: Japanese Patent application Publication No. 07-174028

DISCLOSURE OF THE INVENTION

[Problems to be Solved by the Invention]

However, when the cantilever-type intake control valve is employed as with the intake device of Patent Document 1, the moment applied to the valve body by the intake flow is increased, because a length from the valve shaft to the end portion is increased. For this reason, when the cantilever-type intake control valve is employed in the intake device, retaining torque for retaining the posture of the valve body is required to be large. This raises a problem that an actuator becomes larger.

By the way, in addition to the cantilever type described above, there is conventionally known a butterfly type as one type of the intake control valve. In the butterfly type intake control valve, the valve body is almost symmetrically arranged with respect to the valve shaft. Regarding to the butterfly-type intake control valve, the intake flow almost evenly acts on a right portion or a left portion of the valve body with respect to the valve shaft. This brings an advantage of making the retaining torque smaller than the cantilever-type intake control valve. Such a butterfly-type intake control valve is broadly employed as a throttle valve which controls an intake volume.

In the butterfly-type intake control valve employed as the throttle valve, the valve shaft is disposed at the center of the intake passage. Therefore, when the intake volume is reduced by rotating the valve body, two streams of the intake flow are respectively formed along upper and lower inner walls (or left and right inner walls). However, when the intake control valve is disposed for forming the above mentioned tumble flow or swirl flow, it is required that the intake flow be collected to one side of the intake passage in forming the half open state or the full closed state. This is because plural (two) flows are formed and the streams of the intake flow interrupt each other and get weakened, as with the throttle valve. It is therefore difficult to form the tumble flow or the swirl flow by using the conventional butterfly-type intake control valve.

The present invention has an object to solve the conventional problem mentioned above and to provide an intake device that forms a vortex flow with a simple structure.

[Means for Solving the Problem]

The above described object is achieved by an intake device for an internal combustion engine, in which a valve body rotatable about a valve shaft is provided within an intake passage and by which an intake flow is controlled, the intake device characterized in that: the valve shaft is eccentric with a center of the valve body and is supported at a position eccentric with a center of the intake passage; and when the valve body rotates, a half open state is formed from a fully closed state via a fully open state.

According to an aspect of the present invention, a general butterfly-type intake control valve are simply altered, that is, the valve shaft is altered to be eccentric with the valve body and is further altered to be eccentric with the center of the intake passage, so that the fully closed state, the fully open state, and the half open state can be formed and the vortex flow can be formed into the cylinder.

Additionally, the valve body may be disposed to be slant to a downstream when the fully closed state is formed. This makes it possible to reduce a load on the valve body.

Further the valve body may be provided with a cutout portion at an end portion thereof, the cutout portion narrowing a width of a flow path of the intake flow and causing the intake flow to go into a cylinder when the fully closed state is formed, and the intake passage may be provided with an intake flow interrupting structure, the intake flow interrupting structure interrupting the intake flow to go to downstream via the cutout portion when the valve body is reversed and comes into contact with an inner wall of the intake passage so that the half open state is formed. In this case, a further stronger vortex flow is formed within the cylinder.

Furthermore, an actuator may be coupled with the valve shaft, and a change in the state from the fully closed state to the half open state and the change in the state from the half open state to the fully open state may be formed by reversely rotating the actuator. This forms three states of the fully closed, fully open, and half open states by forwardly or reversely rotating the actuator.

Also, the air intake interrupting structure may be disposed at an upstream side from the valve shaft, and the valve body may be slant relative to a flowing direction of the intake flow so as to guide the intake flow from an interrupting side at which the intake flow is interrupted by the air intake interrupting structure to an opening side through which the intake flow passes. This causes the intake flow toward the interrupting side of the valve body to go toward the open side thereof, and prevents the pressure loss in the half open state.

The valve body may reduce the intake flow such that the intake flow goes along an upper side of the inner wall, of the intake passage, with respect to the valve shaft in the fully closed state, and the valve body may reduce the intake flow such that the intake flow goes along an lower side of the inner wall, of the intake passage, with respect to the valve shaft. This forms the strong tumble flow both in the fully closed state and in the half open state.

[Effect of the Invention]

According to the present invention, there is provided an intake device in which a vortex flow is formed into a cylinder by a simple structure.

BRIEF DESCRIPTION OF THE DRAWINGS

FIG. 3A shows the fully closed state; FIG. 3B shows the fully open state; and FIG. 3C shows the half open state;

FIG. 5A shows the intake control valve removed from; FIG. 5B is a perspective top view of the fully closed state formed by the intake control valve; FIG. 5C schematically shows a state of the problem pointed out;

FIG. 6A shows the fully closed state; FIG. 6B shows the fully open state; FIG. 6C shows the half open state;

FIG. 9A shows the fully closed state; FIG. 9B shows the fully open state; and FIG. 9C shows the half open state;

FIG. 10A shows the fully closed state; FIG. 10B shows the fully open state; FIG. 10C shows the half open state;

FIG. 11A shows the fully closed state; FIG. 11B shows the fully open state; FIG. 11C shows the half open state.

BEST MODES FOR CARRYING OUT THE INVENTION

In the following, a description will be given of an intake device for combustion engine according to embodiments of the present invention with reference to the drawings.

First Embodiment

Figure 1:
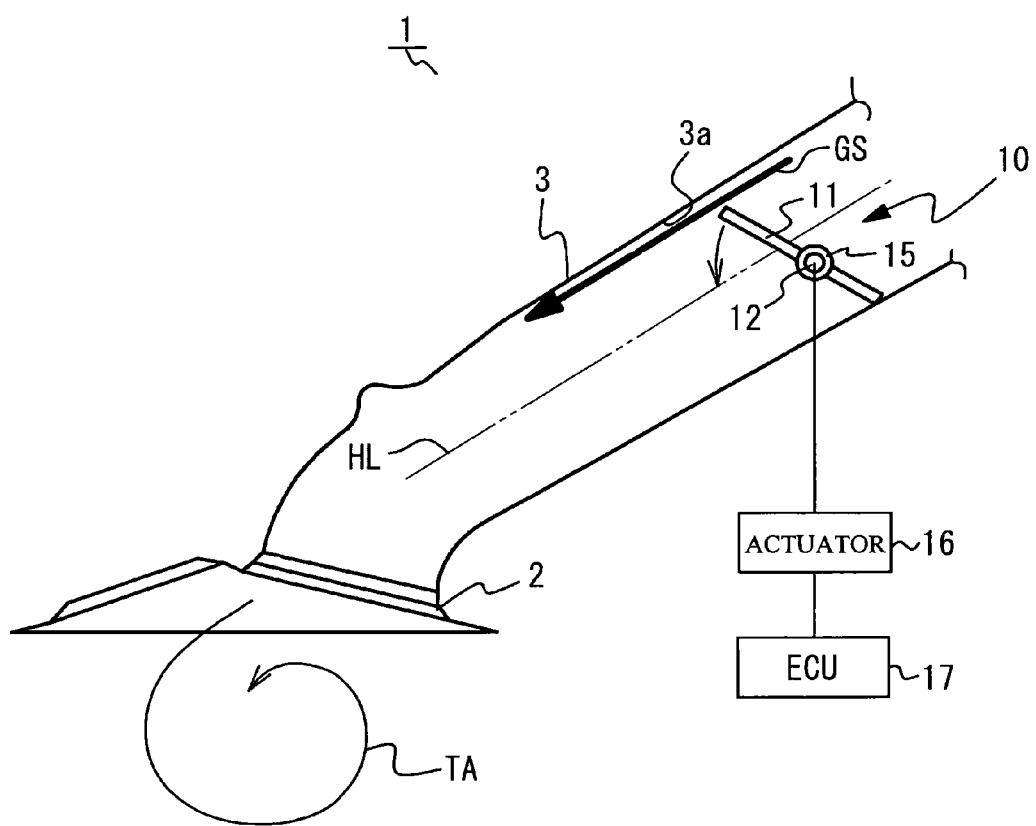
FIG. 1 shows an intake device according to a first embodiment.

FIG. 1 is a view of an intake device 1 according to a first embodiment. The intake device 1, not shown in FIG. 1, is disposed so as to connect a cylinder side of the internal combustion engine with an intake manifold. An end portion 2 is an end, near the cylinder, of the intake device 1. The other end near the intake manifold is not shown. An intake flow GS goes from the intake manifold side to the cylinder as shown. In addition, an intake pipe may be an intake port formed in a cylinder head of the internal combustion engine. However, the present invention is not limited to the above arrangement. That is, the intake passage, according to embodiments of the present invention, may be a part of the intake manifold or a separate intake pipe. The following embodiments will be described without specifically limiting the intake passage. Additionally, the description will be given of this intake device 1 as the intake device that forms the tumble flow (vertical vortex flow) TA.

The intake device 1 has an intake passage 3 having a hollow thorough which the intake flow GS goes. An intake control valve 10 is disposed within the intake passage 3. It is desirable that the intake control valve 10 be disposed in a linear portion of an inner wall 3a ranging from the disposed position to a downstream side, as shown. When the inner wall 3a at the downstream side from the intake control valve 10 is flat and linear, the intake flow GS goes into the cylinder side without being disturbed. Therefore, the tumble flow TA is strongly formed.

The above intake control valve 10 is composed of a valve body 11 having a plate shape and a valve shaft 12. The valve body 11 is made of a member having a plate shape, and the profile thereof may have a round shape, an ellipsoidal shape, a rectangular shape, or the like according to the internal shape of the intake passage 3. Further, the valve body 11 is preferably formed to be larger than the area of the intake pipe (cross-section area perpendicular to the direction of the intake flow GS) That is, the valve body 11 is preferably slant when the intake passage 3 is closed by the valve body 11.

FIG. 1 illustrates a fully closed state in which the intake passage 3 is closed by the valve body 11. However, according to the present invention, the fully closed state is a state in which the tumble flow TA becomes the strongest, when the intake flow GS is strongly made to flow to the downstream by reducing the cross-section area most, reducing the flow volume thereof, and increasing the pressure thereof. That is, the fully closed state is not intended to fully close of the intake passage 3 and stop of the intake flow GS, but is intended to reduce the intake passage 3 as much as possible by means of the valve body 11.

The above valve body 11 is rotated about the valve shaft 12. In the present embodiment, the valve shaft 12 extends from side portions of the valve body 11 to the outsides thereof. The valve shaft 12 and the valve body 11 may be integrally formed, or may be separately formed. When the valve shaft 12 and the valve body 11 are separately formed, a recess portion is arranged in a side wall portion of the valve body 11 and a cylindrical shaft member serving as the valve shaft 12 is fitted and secured on the recess portion.

The above valve shaft 12 is supported with a bearing 15 provided on the side of the intake passage 3, and rotates about the bearing 15. Further, a rotational force is transmitted from an actuator 16 to the valve shaft 12. The rotational direction and the driving amount of the actuator 16 are controlled by an ECU (Electronic Control Unit) 17. This ECU 17 may be shared with an ECU controlling the internal combustion engine not shown. In this case, the intake control valve 10 can be rotated to a desirable position by controlling the actuator 16 in response with the state of the internal combustion engine.

At a glance, the structure of the intake control valve 10 mentioned above is similar to that of a conventional butterfly-type intake control valve. In the intake control valve 10, however, the position of the valve shaft 12 relative to the valve body 11 and the position of the valve shaft 12 relative to the intake passage 3 are different from the conventional butterfly-type intake control valve. This point is further described with reference to FIG. 2.

Figure 2A:
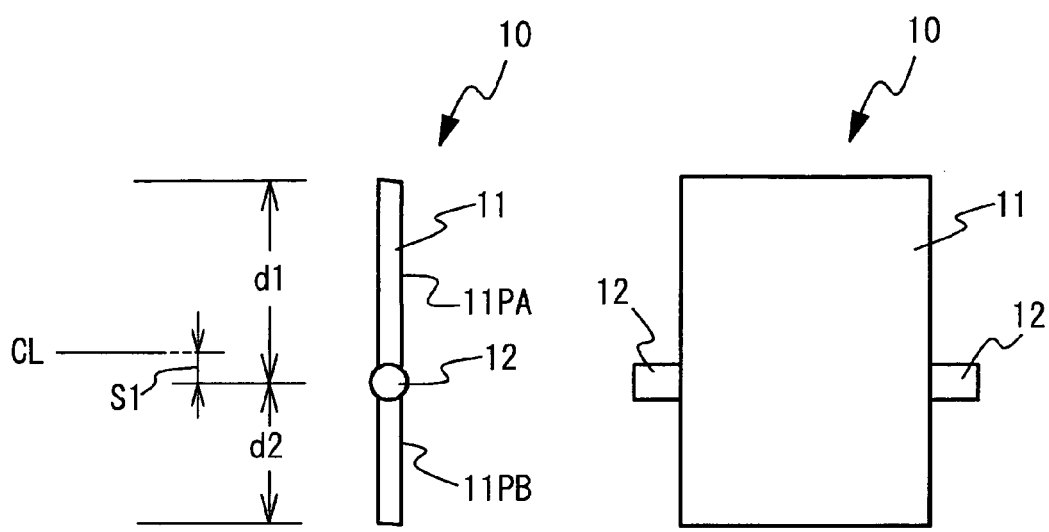
FIG. 2A is a view of the intake control valve which is removed from the intake device.
Figure 2B:
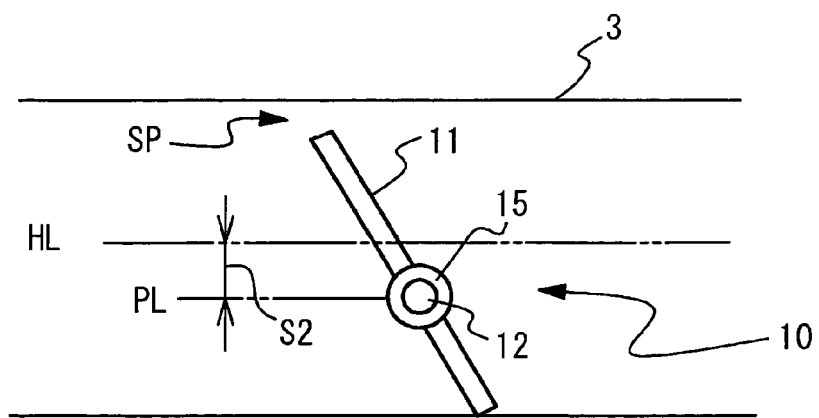
FIG. 2B is a view of the intake control valve and the intake passage, of the intake device shown in FIG. 1, which are removed.

FIG. 2A is a view of the intake control valve 10 that is removed from the intake device 1, and FIG. 2B is a view of the intake control valve 10 and the intake passage 3 that are removed in the same manner. Additionally, FIG. 2A illustrates a front view of the intake control valve 10 (when viewed to the downstream direction) on the right-hand side. This illustration shows the valve body 11 having a rectangular shape.

As shown in FIG. 2A, in the intake control valve 10, the valve shaft 12 is eccentric with the center position CL of the valve body 11 by a length S1. Consequently, a long side 11PA having a length d1 corresponds to an upper side from the valve shaft 12, and a short side 11PB having a length d2 corresponds to an lower side from the valve shaft 12. As shown in FIG. 2B, the valve shaft 12 is rotatably supported at a position PL being eccentric with a center position HL of the intake passage 3 by a length S2. Additionally, the valve body 11 is designed such that a predetermined space SP is defined between an end of the long side 11PA and the inner wall 3*a* of the intake passage 3, when the fully closed state shown in FIG. 2B is formed.

As described above, in the conventional butterfly valve, the valve shaft is positioned at the width center of the intake pipe, and the valve body is formed to be diphycercal symmentric (or bilaterally symmetric) with respect to the valve shaft. Therefore, the intake flow is not biased to one side, and it is difficult to form the tumble flow. The above intake control valve 10 overcomes this drawback.

The intake control valve 10 according to the present embodiment satisfies the following two points. First, (1) the valve shaft 12 is eccentric with the center position CL of the valve body 11. Next, (2) the valve shaft 12 is supported at a position eccentric with the center position HL of the intake passage 3. When the condition of the above (1) and (2) are set, the intake control valve which basically has a butterfly type is used to form the tumble flow. In the intake device 1 according to the present embodiment, the rotation of the valve body 11 forms a half open state from the fully closed state via the fully open state. That is, the fully closed state and the half open state are formed before and after the fully open state. In the conventional type of a general intake device, the half open state is formed between the fully closed state and the fully open state (see FIG. 3 of Patent Document 1). In the intake device 1 according to the present embodiment; however, the fully closed state can be directly shifted from the fully open state. Additionally, even if any one of the above two conditions is satisfied, the three states of the fully closed state, the fully open state, and the half open state, are not formed.

Figure 3A:
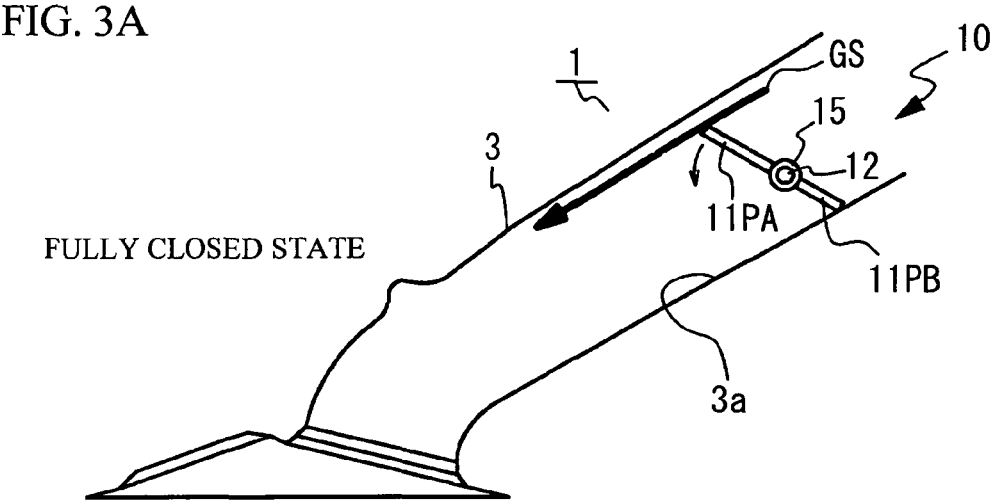
FIGS. 3A to 3C are views of the actions of the intake device 1.
Figure 3B:
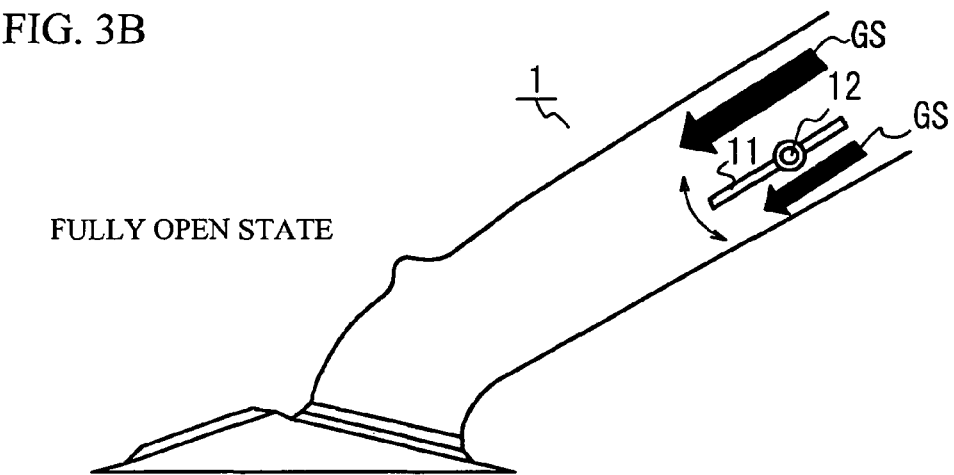
Figure 3C:
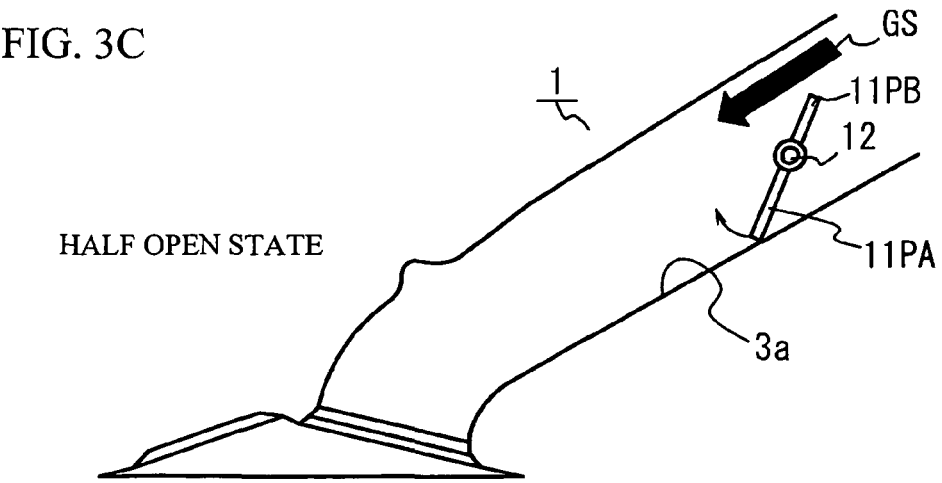

Further, the actions of the intake device 1 are summarized below. FIGS. 3A to 3C are views of the actions of the intake device 1. FIG. 3A shows the fully closed state, FIG. 3B shows the fully open state, and FIG. 3C shows the half open state. FIG. 3A corresponds to FIG. 1.

In the fully closed state shown in FIG. 3A, the short side 11PB of the valve body 11 comes into contact with (or highly close to) the inner wall 3*a* of the intake passage 3. This stops the intake flow. At this time, the space SP is formed at the end of the valve body 11 side, thereby forming the strong tumble flow. Additionally, the inner wall 3*a* may be flat at the position with which the short side 11PB abuts.

When the valve body 11 rotates counterclockwise from the state shown in FIG. 3A, the fully open state shown in FIG. 3B is formed. In this state, the flowing direction of the intake flow GS is in parallel with the valve body 11, in which an intake volume is largest. At this time, the tumble flow is weakened most.

When the valve body 11 further rotates counterclockwise from the state shown in FIG. 3B, the half open state shown in FIG. 3C is formed. At this time, the long side 11PA comes into contact with (highly close to) the inner wall 3*a* of the intake passage 3. At this time, the short side 11PB is projected to restrict the intake flow GS. However, in contrast to the state of the long side 11PA shown in FIG. 3A, the space between the end of the short side 11PB and the inner wall 3*a* is larger, thereby forming a moderate tumble flow. Additionally, the position at which the long side 11PA comes into contact with the inner wall 3*a* may also be flat.

By the way, the valve body 11 is subjected to the greatest pressured from the intake flow GS, when the fully closed state is formed. Therefore, it is preferable that the load on the valve body 11 be reduced at the fully closed state. In the present embodiment, the valve body 11 is disposed in consideration of this point. FIG. 3A and 3C are compared, the end of the long side 11PA of the valve body 11 is tilted to the downstream side with restricting the intake flow GS, when the fully closed state shown in FIG. 3A is formed. The end of the short side 11PB of the valve body 11 is slanted to the upstream side with restricting the intake flow GS, when the half open state shown in FIG. 3C is formed. The long side 11PA of the valve body 11 is slanted to the downstream side along the intake flow GS, when the valve body 11 is subjected to the greatest pressure by the intake flow GS, so that the intake flow GS is guided along the surface of the valve body 11 via the space SP and goes to the downstream side. This reduces the load on the valve body 11 when the fully closed state is formed.

The intake device 1, according to the first embodiment mentioned above, includes the intake control valve 10 based on the butterfly-type control valve. This forms the half open state from the fully closed state via the fully open state by simply rotating the valve body 11. Therefore, the combustion efficiency and the output of the internal combustion engine can be improved by forming the desired tumble flow. The above intake control valve 10 is achieved by a simple structure in which the valve shaft 12 is eccentric with the center of the valve body 11 and is also centric with the center of the intake passage 3. Accordingly, the intake device 1 can be produced without increasing the cost. Since the intake control valve 10 is based on the butterfly type, the retaining torque can be reduced as compared with the cantilever type. This reduces the actuator 16 in size.

Second Embodiment

Figure 4:
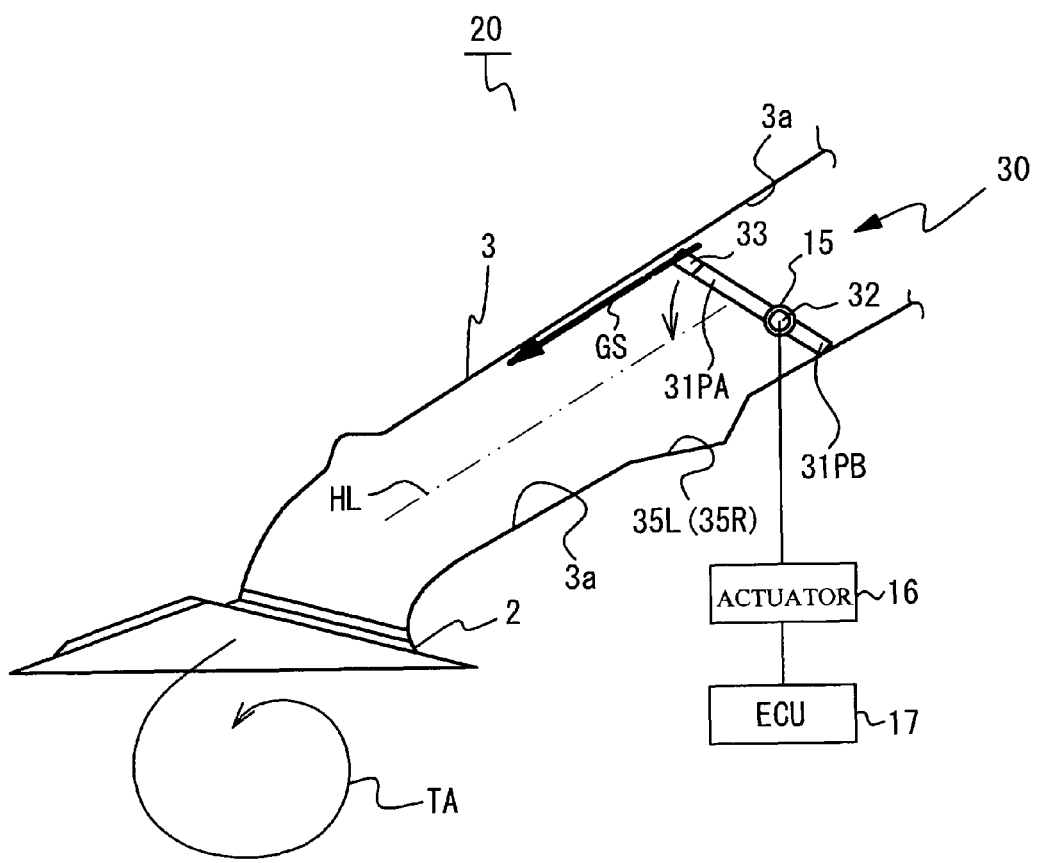
FIG. 4 is a view of an intake device according to a second embodiment.

Further, a description will be given of an intake device according to a second embodiment of the present invention with reference to the drawings. FIG. 4 is a view of an intake device 20 according to the second embodiment. FIG. 4 shows the intake device 20, as with the intake device 1 according to the first embodiment shown in FIG. 1. Like numerals depict like members or components of the intake device 1 according to the first embodiment to avoid duplication of explanation in FIG. 4.

Also, in an intake control valve 30 of the intake device 20, a valve shaft 32 is eccentric with the center of the valve body 31, and the valve shaft 32 is supported at a position eccentric with the center of the intake passage 3. Therefore, in the intake control valve 30, an upper side from the valve shaft 32 is a long side 31PA, and a lower side thereof is a short side 31PB.

Figure 5A:
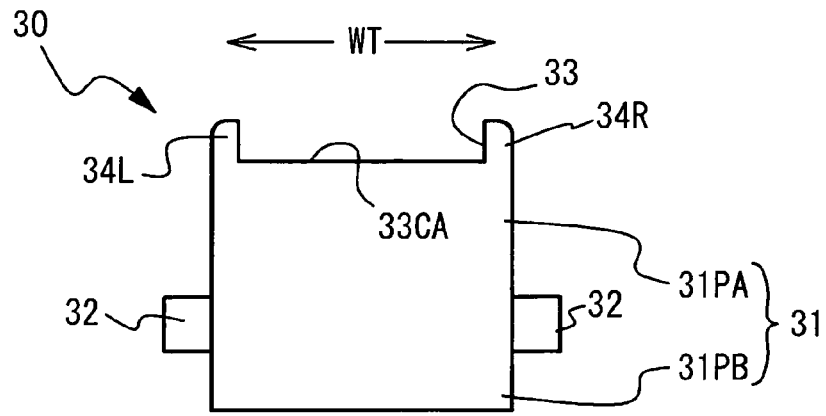
FIGS. 5A to 5C are views of the intake control valve according to the second embodiment.
Figure 5B:
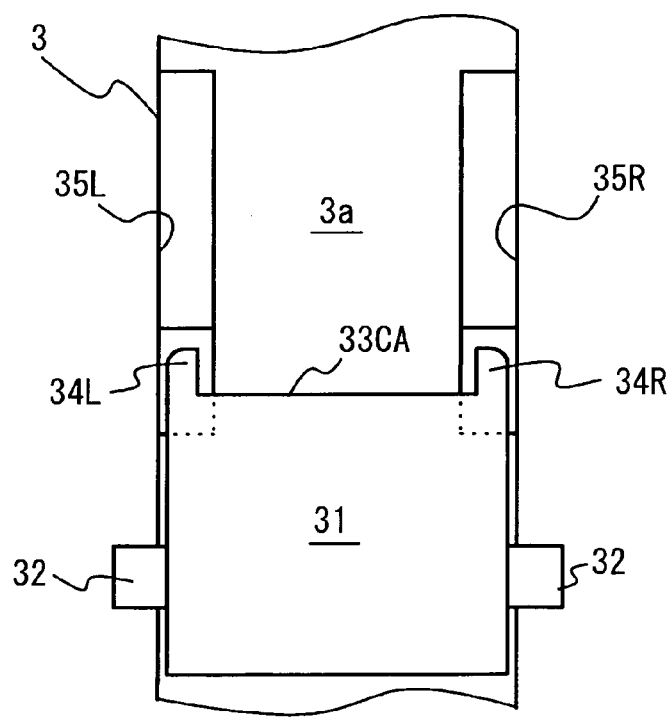
Figure 5C:
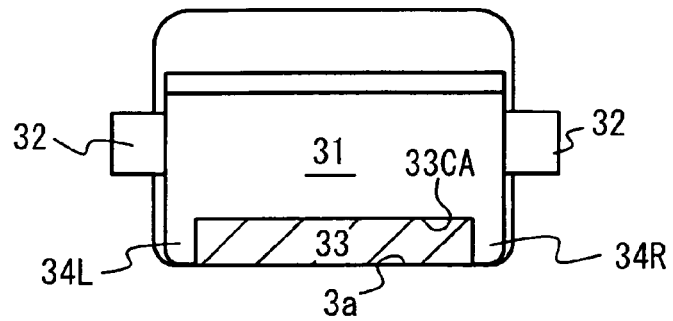

FIGS. 5A to 5C are views of the intake control valve 30, FIG. 5A shows the intake control valve 30 removed, FIG. 5B is a perspective top view of the fully closed state formed by the intake control valve 30.

The valve body 31 of the intake control valve 30 includes a cutout portion 33. This point differs from the intake control valve 10, according to the first embodiment, mentioned above. Specifically, as shown in FIG. 5A, the cutout portion 33 having a generally rectangular shape is formed at an end of the long side 31PA of the valve body 31. In this manner, the cutout portion at the end provides the structure in which a flowing width WT (a width in which the intake flow GS passes) within the intake passage 3 is narrowed (reduced). This allows the intake flow to strongly flow into the cylinder on the downstream side. Accordingly, the intake device 20 according to the second embodiment makes the tumble flow further stronger, and further improves the combustion efficiency and the output of the internal combustion engine, as compared with the intake device 1 according to the first embodiment. Consequently, when the exhaust emission is easily increased, such as when the internal combustion engine is cold-started, the fuel consumption can be saved and the emission can be improved by forming the further stronger tumble flow.

However, when the valve body 31 has the cutout portion 33 at the end of the long side 31PA as mentioned above, and the valve body 31 is shaped to have portions (hereinafter referred to as corner portions 34R and 34L) projecting in a horn shape at both side thereof. Therefore, when the half open state is formed by reversing the valve body 31, the corner portions 34R and 34L come into contact with the inner wall 3a. Here, if the inner wall 3a has a linear shape, the cutout portion 33 serves as a gap. The intake flow will go to the downstream side via this cutout portion 33. FIG. 5C schematically shows a state of the problem pointed out here for comparison. Additionally, hatching is applied to the cutout portion 33 for the sake of clarity in FIG. 5C. As shown in the drawing, if the intake flow leaks via the cutout portion 33 at the time when the half open state is formed, that effect will be reduced by half or will be ineffective, even if the strong tumble flow is formed at the time when the fully closed state is formed. Hence, in the intake device 20 according to the second embodiment, an intake flow interrupting structure for interrupting the intake flow to the downstream side via the cutout portion 33 when the half open state is formed.

For example, the inner wall 3a of the intake passage 3 is provided with depression portions accommodating the corner portions 34R and 34L, when the valve body 31 rotates for forming the half open state, so that the intake flow interrupting structure is achieved. Referring now to FIG. 5B, this structure will be discussed more specifically. FIG. 5B is a top view of the half open state formed by the valve body 31. Depression portions 35R and 35L are formed at positions in which the corner portions 34R and 34L come into contact with the inner wall 3a of the intake passage 3. The depression portions 35R and 35L each have a depressed shape. These depression portions 35R and 35L have widths and sufficient depths for at least accommodating the corner portions 34R and 34L, respectively. In particular, the depths of the depression portions 35R and the 35L are designed such that a linear portion 33CA of the cutout which lies between the corner portions 34R and 34L is contactable with the surface of the inner wall 3a.

Figure 6A:
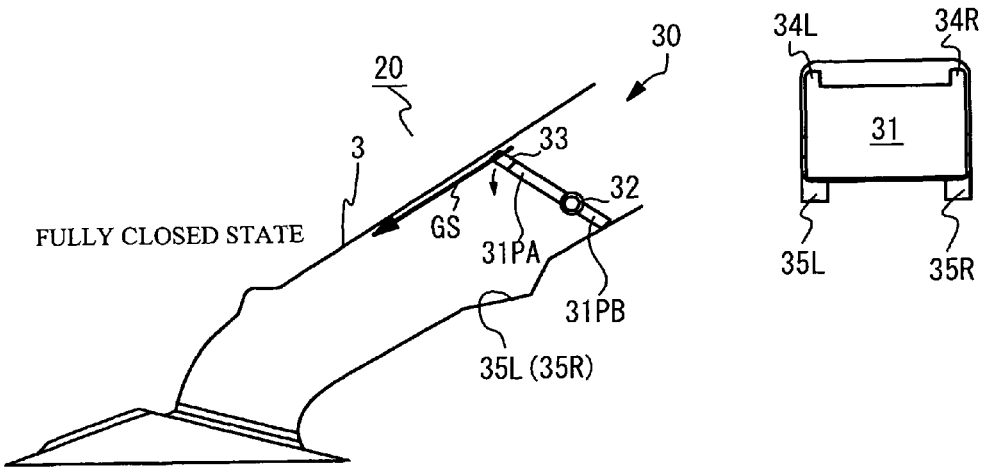
FIGS. 6A to 6C show the actions of the intake device according to the second embodiment.
Figure 6B:
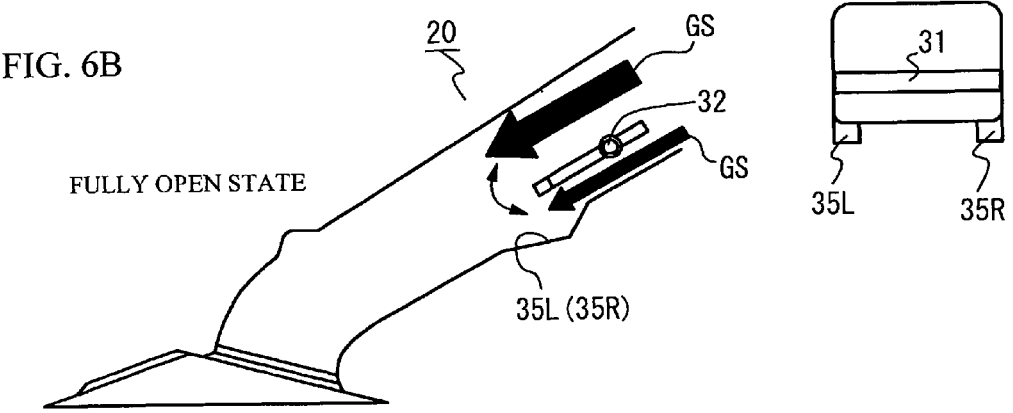
Figure 6C:
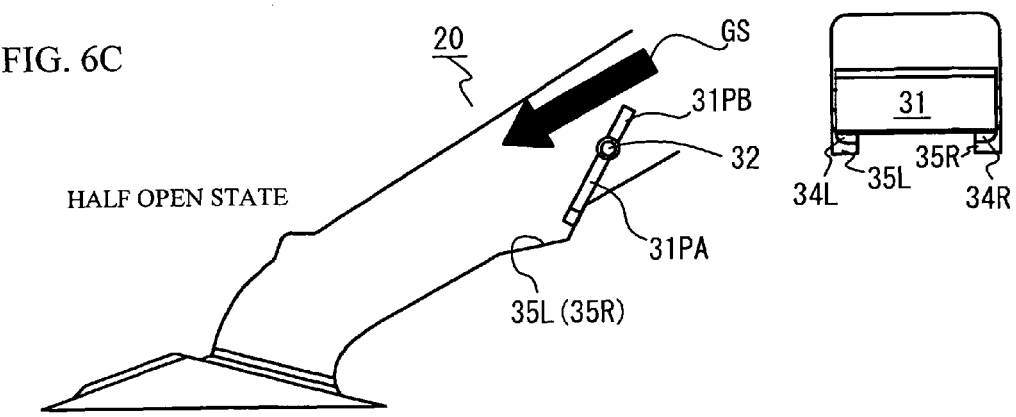

The actions of the intake device 20 having the above configurations will be described together. FIGS. 6A to 6C show the actions of the intake device 20, FIG. 6A shows the fully closed state corresponding to FIG. 4, FIG. 6B shows the fully open state, and FIG. 6C shows the half open state. Additionally, each drawing shows the posture of the valve body 31 on the right-hand side when viewed in the downstream direction.

In the fully closed state shown in FIG. 6A, the short side 31PB of the valve body 31 comes into contact with the lower side of the inner wall 3a of the intake passage 3, whereby the intake flow GS is interrupted. At this time since the cutout portion 33 is formed at the end of the long side 31PA, a strong tumble flow is formed by narrowing the flow path width of the intake flow GS.

The valve body 11 rotates counterclockwise from the filly closed state shown in FIG. 6A, thereby forming the fully open state shown in FIG. 6B. This state makes the flowing direction of the intake flow GS and the valve body 11 parallel with each other, and makes the intake volume largest. At this time, the tumble flow becomes weakest. This fully open state is similar to that of the intake device 1 according to the first embodiment.

Then, the valve body 31 further rotates counterclockwise from the state shown in FIG. 6B, thereby forming the half open state shown in FIG. 6C. At this state, the corner portions 34R and 34L of the long side 31PA can be accommodated into the depression portions 35R and 35L formed in the intake passage 3, respectively. This interrupts the intake flow without leakage at the time when the half open state is formed, even if the cutout portion 33 is formed at the end portion of the long side 31PA. As a result, the short side 11PB is projected such that the intake flow GS is interrupted, so that the moderate tumble flow is formed, similarly to the intake device 1 according to the first embodiment.

As described heretofore, in the intake device 20 according to the second embodiment, the cutout portion 33 is provided at the end portion of the long side 31PA. This forms the tumble flow stronger than that formed by the intake device 1 according to the first embodiment. Then, since the corner portions 34R and 34L are respectively accommodated in the depression portions 35R and 35L provided in the inner wall of the intake passage 3 when the half open state is formed, the half open state is formed, in a similar manner to the case according to the first embodiment.

Figure 7:
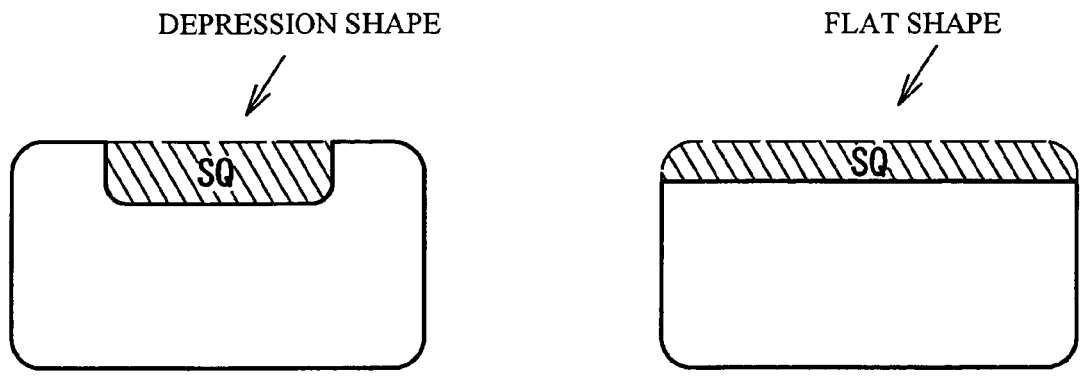
FIG. 7 is an explanatory view of the valve body shape for forming the stronger tumble flow, when the fully closed state or the half open state is formed.
Figure 7:
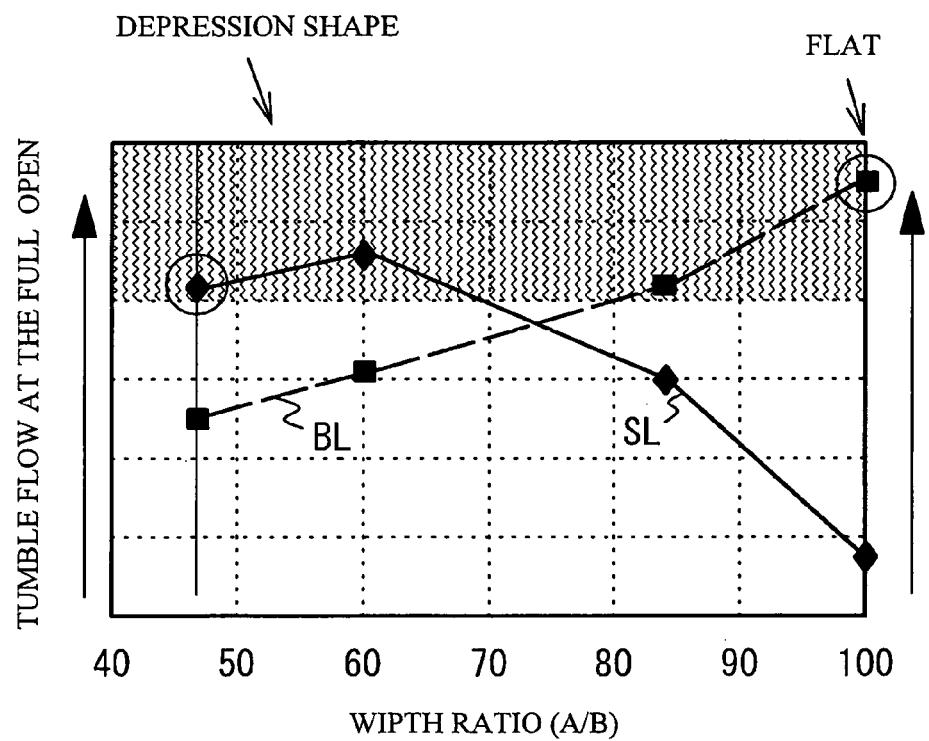
Figure 7:
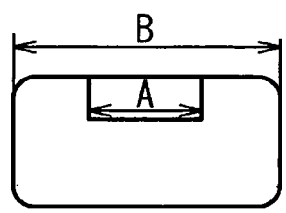
Figure 8:
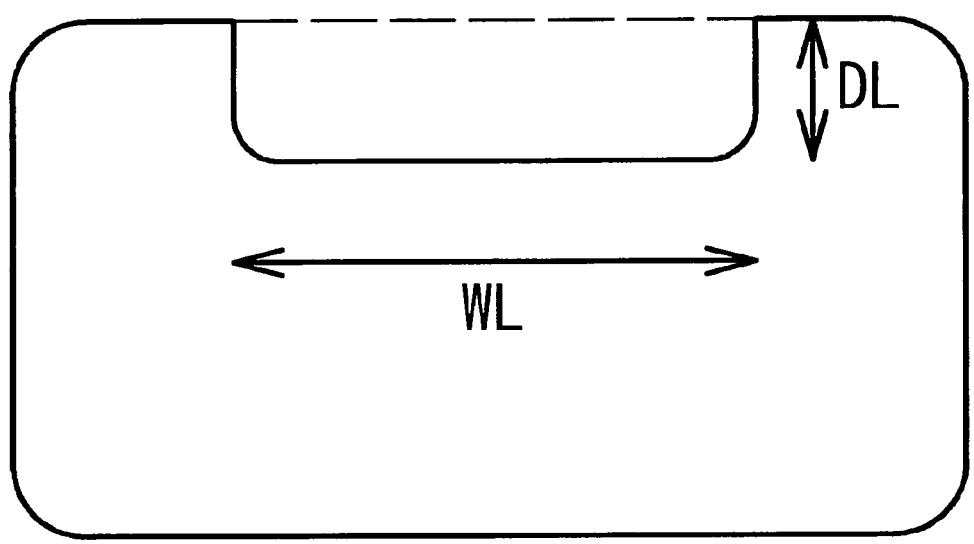
FIG. 8 shows a preferable dimensional ratio of the cutout portion provided in the valve body.

Further, a preferable shape of the above valve body 31 will be described with reference to FIGS. 7 and 8. The inventors of the present application have verified the valve body shape for forming strong tumble flow by experiments. This point will be described. FIG. 7 is an explanatory view of the valve body shape for forming the stronger tumble flow, when the fully closed state or the half open state is formed.

First, the preferable valve body for forming the fully closed state will be described. On the upper-left side in FIG. 7, the depression shape, corresponding to the valve body 31 according to the second embodiment, of the cutout portion at the end thereof is illustrated. On the upper-right side in FIG. 7, the flat shape, corresponding to the valve body 11 according to the first embodiment, of the end thereof is illustrated. Here, flow passage areas SQ through which the intake flow passes are set to be identical.

A graph shown in the middle presents how the tumble flow is changed at the fully open state, when the width ratio (A/B) of the cutout portion shown on the lower is varied. Additionally, this graph further shows the tumble flow at the half open state. The left side of the graph shows the strength of the tumble flow at the fully open state. The result is represented by a solid line SL. Also, the right side of the graph shows the strength of the tumble flow at the half open state. The result is represented by a broken line.

Referred now to FIG. 7, in the fully closed state, it can be recognized that the valve body having the cutout at the end portion thereof forms the stronger tumble flow. In a case where the ratio is more than 80 percent by comparatively lengthening the distance A of the cutout portion, that is, in a case where the shape is closely analogous to the flat shape, the strength of the tumble flow is significantly decreased. Accordingly, as shown in FIG. 7, it can be recognized that the stronger tumble flow is formed by the valve body 31 having the cutout portion 33 according to the second embodiment. However, when the distance A is less than 50 percent, the width becomes narrower and the depth becomes deep, and the tumble flow gradually becomes weaker. Consequently, the width ratio (A/B) is preferable to be from 50 to 70 percent.

Further, the condition that the strong tumble flow is formed at the time when the half open state is formed will be confirmed. In this case, as mentioned above, the result is represented by the tumble strength indicator shown at the right side by a broken line BL. As seen by the broken line BL, it is preferable that the end portion of the valve body have a flat shape when the half open state is formed. The valve body 31, according to the second embodiment to be mentioned above, is provided with the cutout portion 33 arranged at the end portion thereof. The end portion of the short side 31PB has a flat shape. Therefore, it can be understood that the valve body 31 has a suitable shape.

Further, the inventors have confirmed a preferable dimensional ratio (ratio of the width WL to the depth DL) of the cutout portion by experiments. FIG. 8 shows a preferable dimensional ratio of the cutout portion provided in the valve body. When the ratio of WL:DL is from 15:1 to 5:1, the tumble flow becomes further stronger.

In the above embodiments, the formation of the tumble flow has been described. However, the present invention is not limited thereto. For example, by simply rotating the valve shaft 12 about the axis of the intake passage 3 by 90 degrees, the intake device for forming the swirl flow is available.

Third Embodiment

Figure 9A:
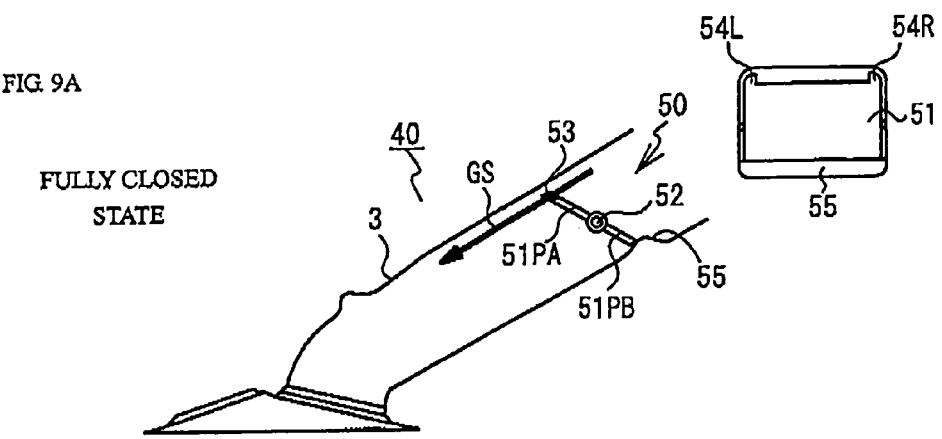
FIGS. 9A to 9C show an intake device according to a third embodiment.
Figure 9B:
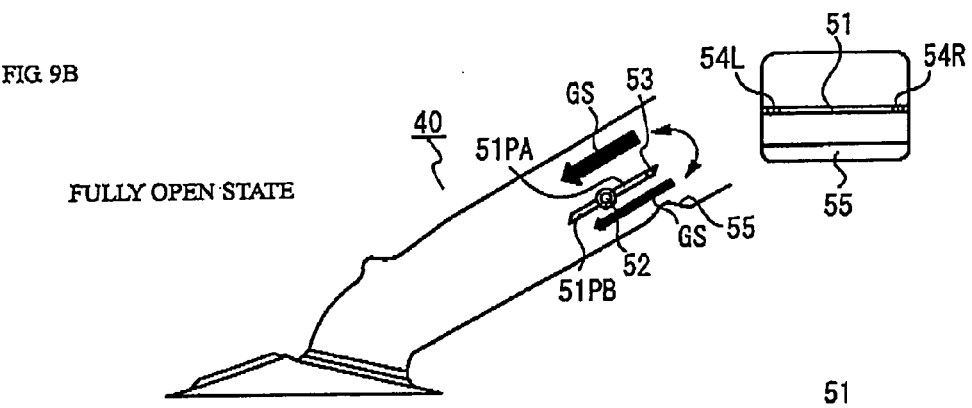
Figure 9C:
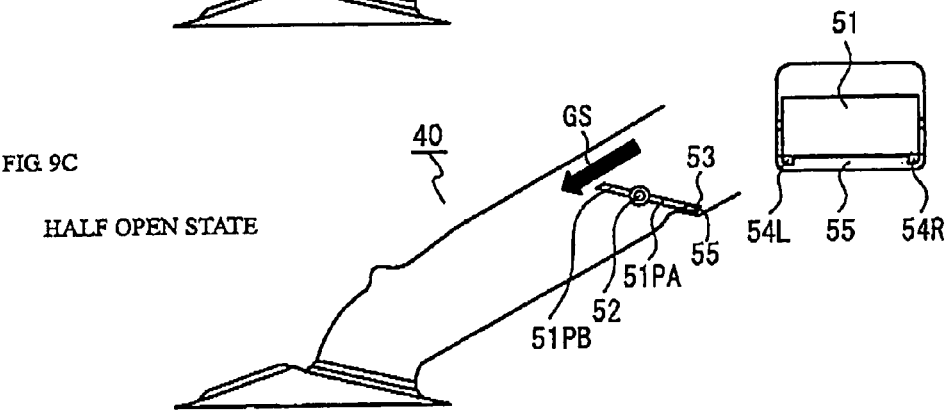

Further, a description will be given of an intake device according to a third embodiment of the present invention with reference to the drawings. FIGS. 9A to 9C show an intake device 40 according to the third embodiment. Like numerals depict like members or components of the intake device 2 according to the second embodiment to avoid duplication of explanation in FIGS. 9A to 9C.

FIGS. 9A to 9C shows the actions of the intake device 40, FIG. 9A shows the fully closed state, FIG. 9B shows the fully open state, and FIG. 9C shows the half open state. Additionally, on the right-hand side in each drawing, the posture of a valve body 51 is shown when viewed in the downstream direction.

Also, in an intake flow control valve 50 of the intake device 40, a valve shaft 52 is eccentric with the center of the valve body 51, and the valve shaft 52 is supported at a position eccentric with the center of the intake passage 3. Therefore, in the intake flow control valve 50, the upper side from the valve shaft 52 is a long side 51PA, and the lower side is a short side 51PB.

The valve body 51 rotates clockwise from the fully closed state shown in FIG. 9A, and then the fully open state shown in FIG. 9B. The valve body 51 further rotates clockwise form the fully open state, and then the half open state shown in FIG. 9C.

The inner wall 3a of the intake device 40 is provided with a contact surface 55. The contact surface 55 is located at the upper side from the position of the valve shaft 52, and comes into contact with corner portions 54R and 54L when the half open state is formed by the valve body 51. The contact surface 55 is substantially parallel to the valve body 51 forming the half open state. The contact surface 55 serves as the intake flow interrupting structure for interrupting the intake flow toward the downstream via a cutout portion 53 when the half open state is formed by the valve body 51.

As shown in FIG. 9C, in the half open state of the valve body 51, the end portion of the long side 51PA is directed to the upstream side, along the flow of the intake flow GS, the end portion of the long side 51PA and the contact surface 55 interrupts the intake flow. The valve body 51 is slant to the flowing direction of the intake flow GS, so that the end of the short side 51PB, through which allows the intake flow GS to pass, is directed to the downstream. The reason why the valve body 51 is capable of forming the half open state in such a manner is that the intake flow interrupting structure is positioned at the upstream side, from the valve shaft 52, of the inner wall 3a. Therefore, the valve body 51 is slant such that the intake flow GS is guided from the end of the long side 51PA to the end of the short side 51PB. This smoothly guides the intake flow directed to the end of the long side 51PA, to the end of the short side 51PB in the half open state. This prevents pressure loss in the half open state.

Even if oil or water is pooled in the contact surface 55, the contact surface 55 is gently slant to the inner wall 3a of the upstream side from the contact surface 55 and to the downstream side from the contact surface 55. Therefore, the valve body 51 in the fully open state allows the intake flow GS to go into the inner wall 3a, and the oil or the water pooled in the contact surface 55 to go to the downstream side.

In addition, the intake device 40 may be provided with a stopper maintaining each state of the valve body 51 in the fully closed state and the half open state. This prevents the variation in the angular position of the valve body 51 in the fully open state or the half open state, and also prevents the variation of the strength of the tumble flow in the fully closed state and in the half open state. This prevents the variation in the fired condition.

Figure 10A:
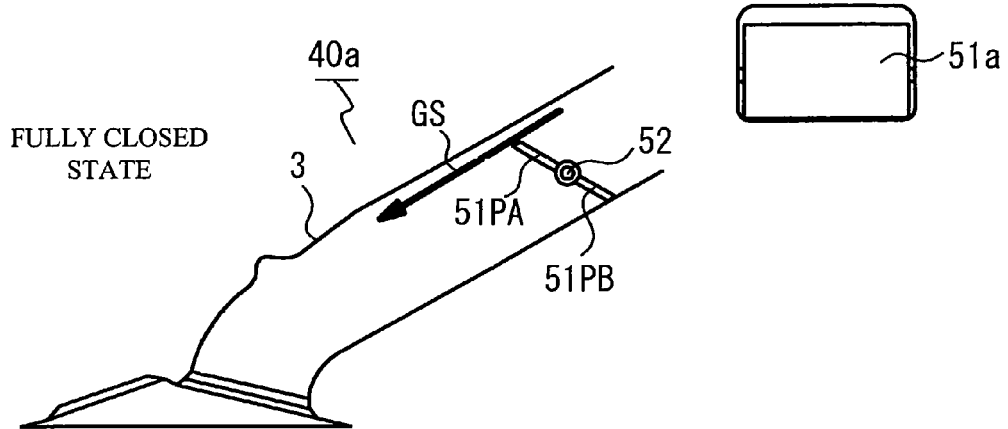
FIGS. 10A to 10C show a modification of the intake device according to the third embodiment.
Figure 10B:
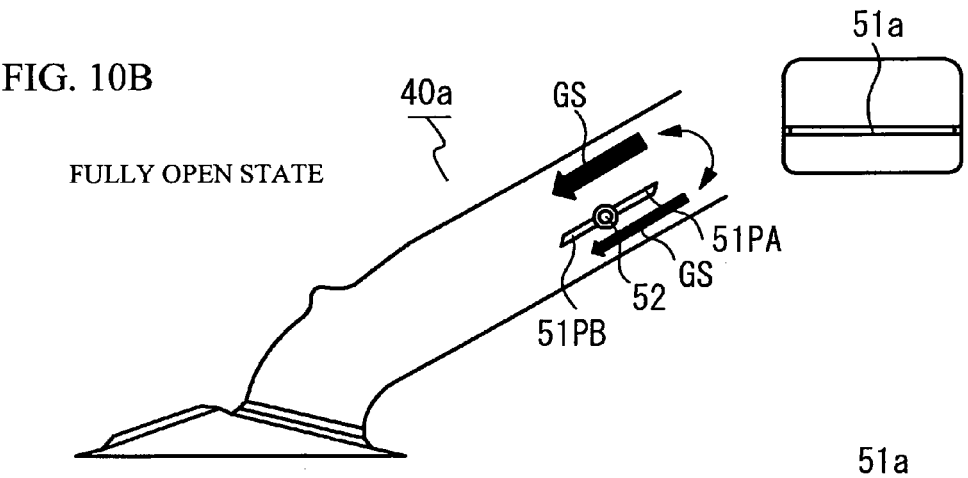
Figure 10C:
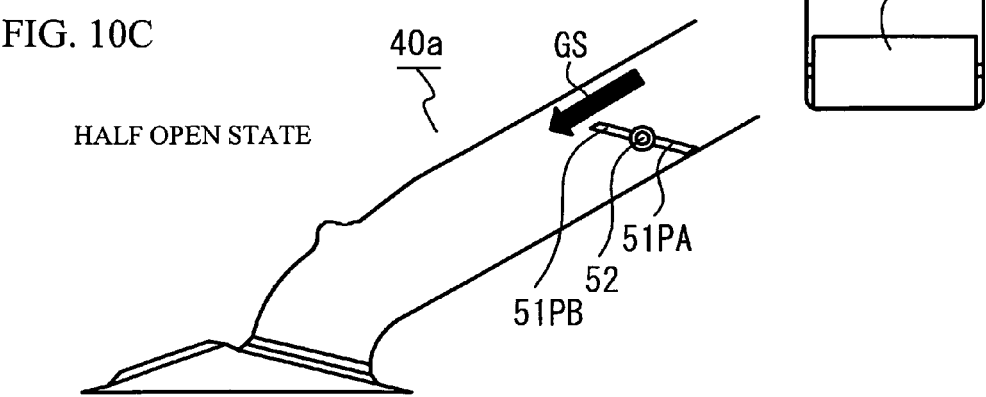

Next, a description will be given of a modification of the intake device according to the third embodiment. FIGS. 10A to 10C show a modification of the intake device according to the third embodiment. FIG. 10A shows the fully closed state, FIG. 10B shows the fully open state, and FIG. 10C shows the half open state.

A valve body 51a does not have a cutout portion at an end of the long side 51PA, but has a flat shape. Additionally, the intake flow interrupting structure mentioned above is not employed in the inner wall 3a. Even if the half open state shown in FIG. 10C is formed, the end portion of the long side 51PA has a flat shape. This prevents the leakage of the intake flow via a gap between the end portion of the long side 51PA and the inner wall 3a.

Additionally, the intake flow interrupting structure is not employed, so that the flow volume of the intake flow in the fully open state is increased.

Fourth Embodiment

Figure 11A:
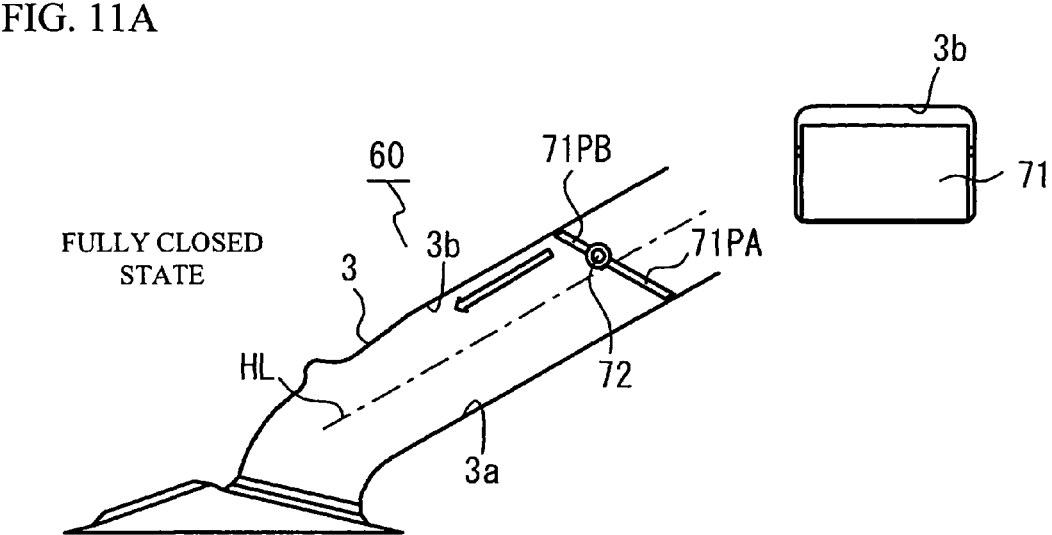
FIGS. 11A to 11C show an intake device according to a fourth embodiment.
Figure 11B:
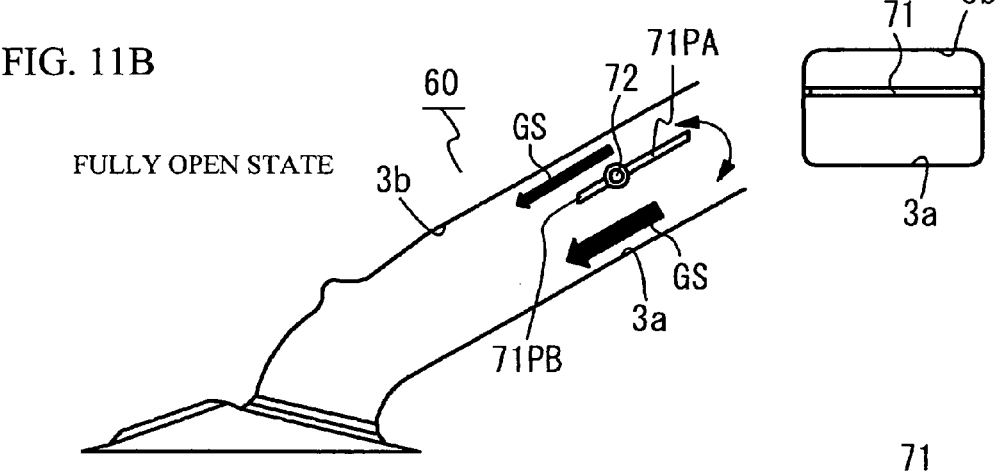
Figure 11C:
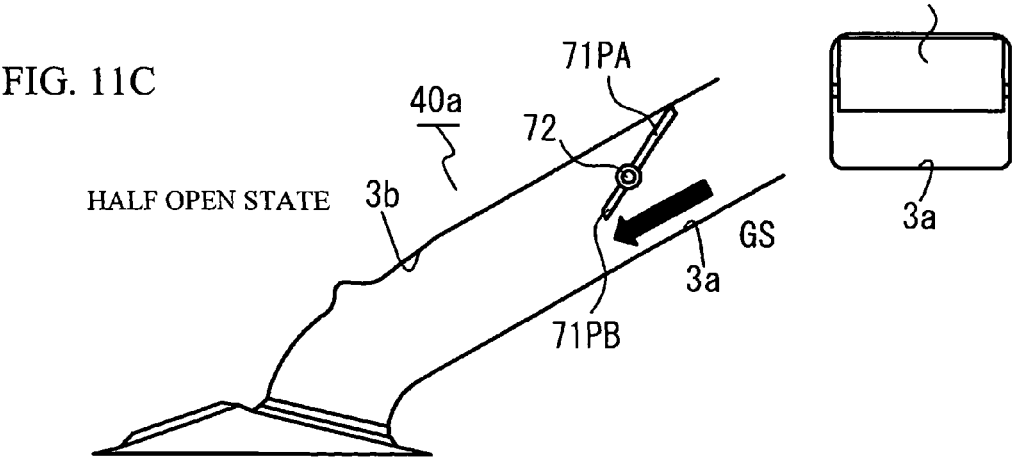

A description will be given of an intake device according to a fourth embodiment of the present invention. FIGS. 11A to 11C show an intake device 60 according to the fourth embodiment. FIGS. 11A to 11C show the intake device 60, in a similar manner to the intake device 1 according to the first embodiment shown in FIG. 1. Like numerals depict like members or components of the intake device 1 according to the first embodiment to avoid duplication of explanation in FIGS. 11A to 11C. Additionally, FIG. 11A shows the fully closed state, FIG. 11B shows the fully open state, and FIG. 11C shows the half open state. Additionally, each drawing shows the posture of the valve body 51 on the right-hand side when viewed in the downstream direction.

In a valve body 71 according to the fourth embodiment, as shown in FIG. 11A, unlike 11, the valve shaft 72 is rotatably supported at a position eccentric with the center position HL and closer to the inner wall 3b. Further, the end of the long side 71PA dose not have the cutout portion but has a flat shape.

In addition, as shown in FIG. 11A, when the valve body 71 forms the fully closed state, the end of the short side 71PB is directed to the inner wall 3b and the end of the long side 71PA comes into contact with the inner wall 3a disposed at lower side with respect to the valve shaft 72. The valve body 71 rotates counterclockwise from the fully closed state, thereby forming the fully open state. The valve body 71 further rotates counterclockwise, thereby forming the half open state. Referring now to FIG. 11C, when the valve body 71 forms the half open state, the end of the long side 71PA comes into contact with the inner wall 3b disposed at the upper side with respect to the valve shaft 72 and the end of the short side 71PB is directed to the inner wall 3a. Therefore, the valve body 71 reduces the intake flow to go along the upper inner wall 3b in the fully closed state. The valve body 71 reduces the intake flow to go along the lower inner wall 3a in the half open state.

Next, referring to FIG. 12, a description will be given of the strength of the tumble flow in the fully closed state and the half open state when the intake flow goes along the lower inner wall 3a of the intake passage 3 and the upper inner wall 3b. The inventors of the present invention have performed comparison experiments in each of the fully closed state and the half opened state, in order to learn how the strength of the tumble flow is changed when the intake flow is made along the inner wall 3a and when the intake flow is made along the inner wall 3b.

Figure 12:
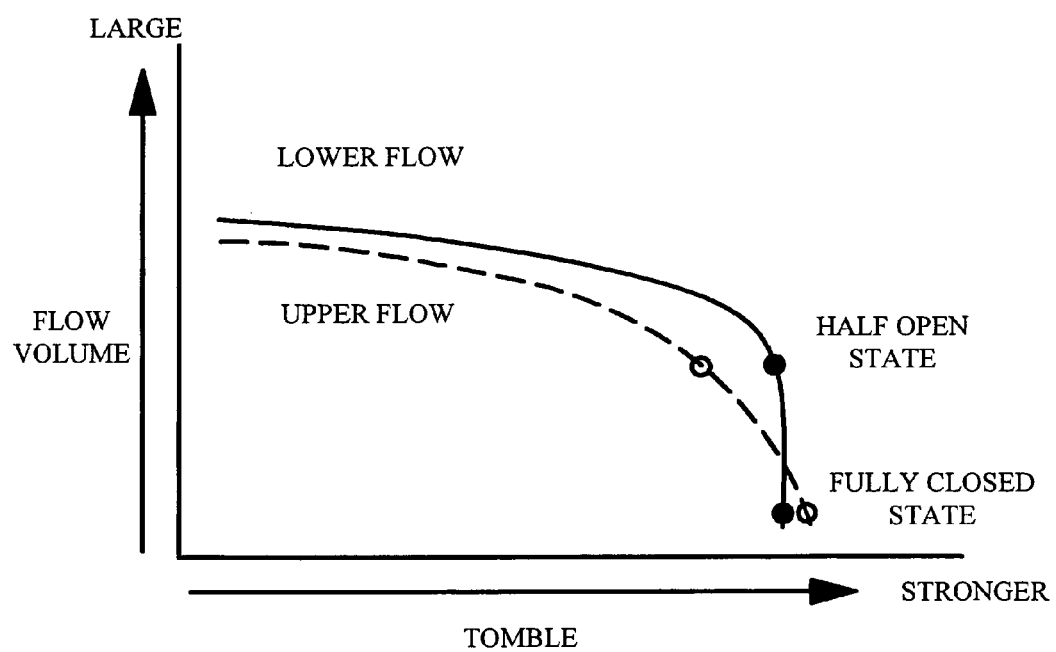
FIG. 12 is a graph representing the relationship between the flow volume and the strength of the tumble flow.

FIG. 12 is a graph in which the vertical axis represents the flow volume and the horizontal axis represents the strength of the tumble flow. In this graph, a broken line represents a relationship between the flow volume and the strength of the tumble flow when the intake flow goes along the upper 3B. The solid line represents a relationship between the flow volume and the strength of the tumble flow when the intake flow goes along the lower 3a. For the sake of simplicity, the intake flow going along the inner wall 3b is referred to as "upper flow" and the intake flow going along the inner wall 3a is referred to as "lower flow".

As shown in FIG. 12, it is understood that the tumble flow is strengthened in the lower flow than in the upper flow when the flow volume is large. Further, when the flow volumes of both cases are compared in the half open state formed by the valve body, it is understood that the tumble flow is stronger in the lower flow than in the upper flow as shown in FIG. 12. Additionally, when the flow volumes of both cases are compared in the fully closed state formed by the valve body, the strength of the upper flow and that of the lower flow are reversed, and it is understood that the tumble flow is stronger in the upper flow than in the lower flow.

In this manner, in order to form further strong tumble flow in both of the fully closed state and the half open state, it is preferable that the lower flow be performed in the half open state and the upper flow be performed in the fully closed state.

As mentioned above, in the intake device 60 according to the fourth embodiment, the tumble flow can be strongly formed in both of the fully closed state and the half open state. Therefore, the strong tumble flow can be formed in the half open state. This improves the mileage at the partial throttle.

The present invention is not limited to the specifically disclosed embodiments, but other embodiments, variations and modifications may be made without departing from the scope of the present invention.

The invention claimed is:

1. An intake device for an internal combustion engine by which an intake flow is controlled, comprising:
    a valve body rotatable about a valve shaft, the valve body being provided within an intake passage, wherein:
    the valve shaft is eccentric with a center of the valve body and is supported at a position eccentric with a center of the intake passage;
    when the valve body rotates, a half open state is formed from a fully closed state via a fully open state;
    the valve body is provided with a cutout portion at an end portion thereof, the cutout portion narrowing a width of a flow path of the intake flow and causing the intake flow to go into a cylinder when the fully closed state is formed; and
    the intake passage is provided with an intake flow interrupting structure, the intake flow interrupting structure interrupting the intake flow to go to downstream via the cutout portion when the valve body is reversed and comes into contact with an inner wall of the intake passage so that the half open state is formed.

2. The intake device for an internal combustion engine according to claim 1, wherein the air intake interrupting structure is disposed at an upstream side from the valve shaft, and
    the valve body is slanted relative to a flowing direction of the intake flow so as to guide the intake flow from an interrupting side at which the intake flow is interrupted by the air intake interrupting structure to an opening side through which the intake flow passes.

* * * * *